United States Patent [19]

Tucker

[11] 4,255,304

[45] Mar. 10, 1981

[54] NICKEL STABILIZERS AND DYE ENHANCERS FOR POLYOLEFINS

[75] Inventor: Robert J. Tucker, Hackettstown, N.J.

[73] Assignee: American Cyanamid Company, Stamford, Conn.

[21] Appl. No.: 46,139

[22] Filed: Jun. 6, 1979

[51] Int. Cl.$^3$ .......................... C08K 5/52; C08K 5/13; C08K 5/10; C08K 5/06
[52] U.S. Cl. ............................ 260/23 H; 260/332 R; 260/45.75 N; 264/213; 264/216
[58] Field of Search ........ 260/45.75 N, 23 H, 33.2 R; 8/180, 92, 93; 252/400 A; 264/213, 216

[56] References Cited

U.S. PATENT DOCUMENTS

| | | | |
|---|---|---|---|
| 3,189,630 | 6/1965 | Smutny | 260/45.75 N |
| 3,723,489 | 3/1973 | Dexter et al. | 260/429 R |
| 3,920,712 | 11/1975 | Spivack et al. | 260/45.75 N |
| 4,144,029 | 3/1979 | Hoffman et al. | 260/45.75 N |

*Primary Examiner*—V. P. Hoke
*Attorney, Agent, or Firm*—Bruce F. Jacobs

[57] ABSTRACT

The addition of a nickel salt of an omega-[4-hydroxyphenyl]-alkanoic acid having at least two alkyl groups on the phenyl ring to a reaction product of a polyalkyl-substituted 4-hydroxy benzoic acid and a secondary or tertiary organic phosphite results in lubricated polyolefins having enhanced resistance to yellowing.

10 Claims, No Drawings

NICKEL STABILIZERS AND DYE ENHANCERS FOR POLYOLEFINS

This invention relates generally to the light stabilization and dyeability of polyolefins. More particularly, it relates to the light stabilization and dye enhancement of polyolefin multifilament fibers, especially polypropylene multifilament fibers.

Hoffman et al., U.S. Pat. No. 4,144,029, the disclosure of which is incorporated herein by reference, provides a nickel stabilizer composition which is effective in stabilizing polyolefins against degradation caused by light and also in enhancing the dyeability of polypropylene with chelatable dyes, preferably water-dispersible aromatic monoazo dyes having a hydroxyl group at one position ortho to the azo group. The composition comprises the products of reaction of (a) 30–90 parts by weight of a compound represented by Formula I:

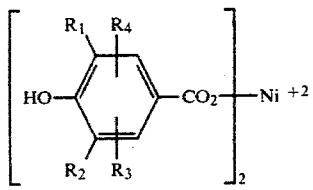
(I)

wherein $R_1$ and $R_2$ are each alkyl radicals containing up to 8 carbon atoms, at least one of which is branched on the alpha carbon atom, and $R_3$ and $R_4$ are each hydrogen or an alkyl radical containing up to 18 carbon atoms; and (b) 10–70 parts by weight of a secondary or tertiary organic phosphite.

Polyolefin multifilaments, particularly polypropylene multifilaments, are ordinarily spun using a spinning lubricant, e.g., an ethoxylated fatty acid or an alkoxylated glycol. When the stabilizer composition of Hoffman et al. is incorporated into the polyolefin and the fibers are spun using an ethoxylated fatty acid lubricant or an alkoxylated glycol, an interaction has been found to occur between the stabilizer and the lubricant which results in yellowing of the fibers. Such yellowing is not tolerable since it influences the shade of dye in subsequent dyeing operations.

The present invention provides an improved stabilizer and dye enhancer composition for use in polyolefins, especially in polyolefin multifilaments and, more particularly, in polypropylene multifilaments, to reduce or eliminate the yellowing which results in the manner described above. In the present composition, either the interaction does not occur or the interaction by-product is non-yellowing.

The composition of the present invention comprises a mixture of (A) 70 to 95 percent by weight of the product of reaction of (a) 30–90 parts by weight of a compound of Formula I and (b) 70–10 parts by weight of a secondary or tertiary organic phosphite, and (B) 5 to 30 percent by weight of a compound represented by Formula II:

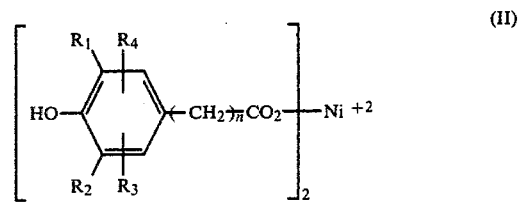
(II)

wherein n is 1 to 3 and $R_1$–$R_4$ are as previously defined.

Preferably, the composition of the invention comprises (A) about 70–80 percent by weight of the reaction product of (a) 70–80 parts by weight of (I) and (b) 20–30 parts by weight of the phosphite, and (B) 20–30 percent by weight of (II). A particularly preferred composition comprises (A) 75 percent by weight of the product of reaction of (a) 70–80 parts by weight of (I) and (b) 20–30 parts by weight of the phosphite, and (B) 25-weight percent of (II).

The compositions are incorporated into the polyolefin in a total amount of from about 0.005 to 10 percent by weight, preferably about 0.25 to 2 percent by weight and, still more preferably, about 1 to 2 percent by weight, based on the weight of polyolefin.

The stabilizer composition is particularly useful in stabilizing polyolefin multifilaments, particularly polypropylene, which are spun using a lubricant, particularly an ethoxylated fatty acid lubricant, or an alkoxylated glycol lubricant. However, the compositions are useful in stabilizing polyolefins generally, i.e., those which are normally subject to degradation caused by light, either in the form of molded articles, films, fibers, or fabrics.

The nickel salts of the following acids are illustrative of compounds of Formula I:
3,5-di-t-butyl-4-hydroxy benzoic acid
3,5-di-isopropyl-4-hydroxy benzoic acid
3,5-di-sec. butyl-4-hydroxy benzoic acid
3-isopropyl-5-t-butyl-4-hydroxy benzoic acid
3,5-dicyclohexyl-4-hydroxy benzoic acid
3-methyl-5-t-butyl-4-hydroxy benzoic acid
2,6-dimethyl-3,5-di-t-butyl-4-hydroxy benzoic acid
2-nonyl-3,5-di-t-butyl-4-hydroxy benzoic acid
3,5-di-t-amyl-4-hydroxy benzoic acid
3,5-di-t-octyl-4-hydroxy benzoic acid, and the like.

The preferred nickel salt for use in the present invention is nickel 3,5-di-t-butyl-4-hydroxy benzoic acid.

Useful secondary and tertiary organic phosphites include, but are not limited to, the following:
dioctadecyl pentaerythrityl diphosphite
diisodecyl pentaerythrityl diphosphite
tridecyl phosphite
distearyl pentaerythrityl diphosphite
distearyl phosphite
tris(nonylphenyl)phosphite
trimethyl phosphite
dioctyl phosphite
poly(diisopropylene glycol phenyl phosphite)
tris(3-hydroxypropyl)phosphite
trioctadecyl phosphite
diphenyl phosphite
triphenyl phosphite
diphenyl isodecyl phosphite
tricyclohexyl phosphite, and the like.

The preferred phosphite for use in the present invention is diisodecyl pentaerythrityl diphosphite.

Nickel salts of the following acids are illustrative of compounds of Formula II:

3-[3,5-di-t-butyl-4-hydroxpheny]propionic acid
3-[3,5-diisopropyl-4-hydroxyphenyl]propionic acid
3-[3,5-di-sec. butyl-4-hydroxypheny]propionic acid
3-[3-isopropyl-5-t-butyl-4-hydroxyphenyl]propionic acid
3-[3,5-dicyclohexyl-4-hydroxyphenyl]propionic acid
3-[3-methyl-5-t-butyl-4-hydroxyphenyl]propionic acid
3-[2,6-dimethyl-3,5-di-t-butyl-4-hydroxyphenyl]-propionic acid
3-[2-nonyl-3,5-di-t-butyl-4-hydroxyphenyl]propionic acid
3-[3-3,5-di-t-amyl-4-hydroxyphenyl]propionic acid
3-[3,5-di-t-octyl-4-hydroxyphenyl]propionic acid
2-[3,5-di-t-butyl-4-hydroxyphenyl]acetic acid
2-[3,5-di-sec. butyl-4-hydroxyphenyl]acetic acid
2-[2,6-dimethyl-3,5-di-t-butyl-4-hydroxyphenyl]-acid
4-[3,5-di-t-butyl-4-hydroxyphenyl]butyric acid
4-[3,5-di-sec. butyl-4-hydroxyphenyl]butyric acid, and the like.

The preferred compound of Formula (II) for use in the present invention is nickel 3-[3,5-di-t-butyl-4-hydroxyphenyl]propionic acid.

The acids from which the nickel salts of Formula II are prepared may be readily prepared as disclosed in the literature. When n is 1 the procedure of U.S. Pat. No. 2,838,571 may be used. When n is 2 or 3, the procedure of U.S. Pat. No. 3,247,240 or U.S. Pat. No. RE 27,004 may be used.

The nickel salts of these acids may be prepared as in U.S. Pat. No. 3,189,630. All of these patents are incorporated herein by reference.

As used herein, the term "Polyolefin" includes homopolymers of alpha olefins such as polyethylene, polypropylene, polybutadiene, polyisoprene, polystyrene, and the like; copolymers of alpha olefins such as ethylene-propylene copolymer, ethylene-butylene copolymer, ethylene-vinyl acetate copolymer, styrene-butadiene copolymer, acrylonitrile-butadiene-styrene terpolymer, and the like. The preferred polyolefin is polypropylene.

The composition of the present invention is intended primarily to be used as a light stabilizer and dye enhancer for polypropylene multifilaments, spun using a lubricant, particularly an alkoxylated glycol or an ethoxylated fatty acid polypropylene lubricant, to provide non-yellowing fibers. In general, the ethoxylated fatty acid and alkoxylated glycol lubricants, per se, are non-yellowing. However, as described above, a definite yellowing in air develops when the composition of Hoffman et al., supra, is used in conjunction with the lubricants.

The ethoxylated fatty acid lubricants have the Formula (III):

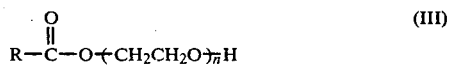

(III)

wherein R is an alkyl group containing from about 12 to 20 carbon atoms and n is an integer of about 2 to 20. Such compounds include the polyethoxylated fatty acids, capric acid, lauric acid, myristic acid, palmitic acid, hexadecanoic acid, stearic acid, eicosanoic acid, and the like. The preferred ethoxylated fatty acid is stearic acid ethoxylated with about 6–10 moles of ethylene oxide.

Alkoxylated glycol lubricants are of the type shown in Formula (IV):

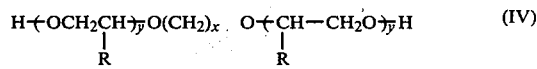

wherein x is an integer of 2 to 4; R is hydrogen or methyl; and y is an integer sufficient to provide a molecular weight of about 250 to 1000. The glycols may be alkoxylated using ethylene oxide, propylene oxide, or mixtures thereof. Glycols include ethylene glycol, propylene glycol, and butylene glycol.

The compositions of the invention are evaluated by dry blending with the polypropylene and melt spinning through a 30-hole (0.020"d.×0.040") spinnerette under the following conditions:

| | | |
|---|---|---|
| Temperature - | spin pack | 510° F. |
| | pump block | 505° F. |
| | smear head | 480° F. |
| | barrel (forward) | 450° F. |
| | barrel (rear) | 400° F. |
| | column top | 210–222° F. |
| Pack pressure | | 340–400 psig |
| Output | | 1.2 lbs/hr |
| Shear rate | | 65 sec$^{-1}$ |
| Spin draw | | 100:1 |

The multifilaments were then drawn under the following conditions:

| | |
|---|---|
| Stage 1 | |
| Temperature | 220° F. |
| Ratio | 5:1 |
| Stage 2 | |
| Temperature | 280° F. |
| Ratio | 1.2:1 |
| Draw (overall) | 6:1 |

The lubricants, as 15% aqueous solutions, were applied to the spun fiber by wicking prior to the drawdown stage. The lubricants may contain an antistatic agent.

The following examples illustrate the invention.

EXAMPLE 1

Unstabilized polypropylene was dry blended with 0.9 percent of the reaction product of (a) 70 parts of nickel 3,5-di-t-butyl-4-hydroxy benzoic acid and (b) 30 parts of diisodecyl pentaerythrityl diphosphite, mixed with 0.1 percent of nickel 3-[3,5-di-t-butyl-4-hydroxyphenyl]-propionic acid, based on the weight of polypropylene (1.0% by weight total). The polymer mixture was spun as described, using as the lubricant an aqueous solution (~15%) of (1) polyoxyethylene (6–10 moles) stearate or (2) alkoxylated (50/50 ethylene/propylene oxide) ethylene glycol (mol. wt. about 250). The spun, drawn yarns were then allowed to stand in air for 4 days and then evaluated. Yarn which was unlubricated (Control) did not yellow; yarn treated with either of the lubricants yellowed very slightly.

When the experiment was repeated using 1.0% by weight of a stabilizer, which is the product of reaction of 70 parts of nickel 3,5-di-t-butyl-4-hydroxy benzoic acid and 30 parts of diisodecyl pentaerythrityl diphosphite (the stabilizer composition of Hoffman et al., U.S. Pat. No. 4,144,029), the lubricated yarn discolored (yellowed) badly.

EXAMPLE 2

Example 1 was repeated except that the stabilizer comprised 0.9 percent of the product of reaction of (a) 70 parts of nickel 3,5-di-t-butyl-4-hydroxyl benzoic acid and (b) 30 parts of diisodecyl pentaerythrityl diphosphite, with 0.3 percent of nickel 3-[3,5-di-t-butyl-4-hydroxyphenyl]-ropionic propionic acid (total 1.2 percent by weight). The lubricant was polyoxyethylene (6–10 moles ethylene oxide) stearate. Unlubricated yarn did not yellow, nor did the yarn treated with the lubricant. When 1.0 or 1.35 percent by weight of the stabilizer of Hoffman et al. (see Example 1 above) was used, the lubricated yarn discolored badly.

EXAMPLE 3

Example 1 was repeated except that the stabilizer comprised 0.75 percent of the product of reaction of 70 parts of nickel 3,5-di-t-butyl-4-hydroxy benzoic acid and 30 parts of diisodecyl pentaerythrityl diphosphite, with 0.25 percent of nickel 3-[3,5-di-t-butyl-4-hydroxyphenyl]propionic acid (total 1.0 percent by weight). The lubricant was polyoxyethylene stearate. Neither the unlubricated nor the lubricated yarns yellowed at all. In contrast, the stabilizer of Hoffman et al. yellowed badly.

The examples illustrate that when nickel 3-[3,5-di-t-butyl-4-hydroxyphenyl]propionic acid is added to the stabilizer of Hoffman et al., in accordance with the invention, yellowing of the multifilament yarns lubricated with polypropylene lubricants, particularly with either polyethoxylated fatty acids or alkoxylated glycols, was either eliminated or greatly reduced. Similar results are obtained when nickel 3-[3,5-di-t-butyl-4-hydroxyphenyl]propionic acid is replaced by analogous acetic and butyric acid derivatives.

What is claimed is:

1. In the preparation of polyolefin multifilament fibers by spinning a polyolefin and coating with a lubricant, wherein the polyolefin has mixed therewith prior to spinning a reaction product of
   (a) 30 to 90 parts by weight of a compound of Formula I:

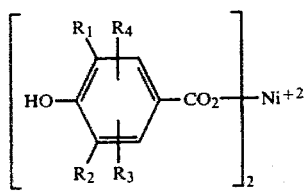

wherein $R_1$ and $R_2$ are each alkyl radicals containing up to 8 carbon atoms, at least one of which is branched on the alpha carbon atom, $R_3$ and $R_4$ are each hydrogen or an alkyl radical containing up to 18 carbon atoms, and
   (b) 70 to 10 parts by weight of a secondary or tertiary organic phosphite, and said lubricant discolors in the presence of said reaction product, the improvement comprising incorporating into said polyolefin prior to spinning a compound of Formula II:

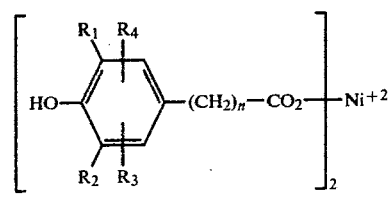

wherein n is 1 to 3 and $R_1$ to $R_4$ are as defined and wherein said compound of Formula II is present as about 5 to 30 percent by weight of the total of said reaction product and said compound of Formula II.

2. The method of claim 1 wherein said reaction product contains 70 to 80 parts by weight of said compound of Formula I and 30 to 20 parts by weight of said phosphite, and said compound of Formula II is present as about 20 to 30 percent by weight of the total of said reaction product and said compound of Formula II.

3. The method of claim 2 wherein said compound of Formula II is present as about 25 percent by weight of the total of said reaction product and said compound of Formula II.

4. The method of claim 1 wherein said compound of Formula I is nickel 3,5-di-t-butyl-4-hydroxy benzoic acid; said phosphite is diisodecyl pentaerrythrityl diphosphite; and said compound of Formula II is nickel 3-[3,5-di-t-butyl-4-hydroxyphenyl]propionic acid.

5. The method of claim 1 wherein the lubricant is an ethoxylated fatty acid of the formula:

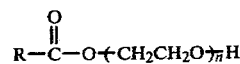

wherein R is alkyl of about 12 to 20 carbon atoms and n is an integer of about 2 to 20.

6. The method of claim 1 wherein the lubricant is an alkoxylated glycol of the formula:

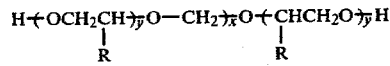

wherein R is hydrogen or methyl, x is an integer of 2 to 4, and y is an integer sufficient to provide a molecular weight of about 250 to 1000.

7. The method of claim 1 wherein said reaction product and said compound of Formula II are present in a total of about 0.005 to 10 percent by weight of the polyolefin.

8. The method of claim 1 wherein said reaction product and said compound of Formula II are present in a total of about 0.25 to 2 percent by weight of the polyolefin.

9. The method of claim 1 wherein the polyolefin is polypropylene.

10. The composition derived from the method of claim 1, 4, 5, 6 or 7.

* * * * *